US009461813B2

United States Patent
Berkram et al.

(10) Patent No.: US 9,461,813 B2
(45) Date of Patent: Oct. 4, 2016

(54) OPTICAL DATA INTERFACE WITH ELECTRICAL FORWARDED CLOCK

(75) Inventors: Daniel A. Berkram, Loveland, CO (US); Dacheng Zhou, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 60 days.

(21) Appl. No.: 14/379,662

(22) PCT Filed: Apr. 24, 2012

(86) PCT No.: PCT/US2012/034790
§ 371 (c)(1),
(2), (4) Date: Aug. 19, 2014

(87) PCT Pub. No.: WO2013/162517
PCT Pub. Date: Oct. 31, 2013

(65) Prior Publication Data
US 2015/0010312 A1   Jan. 8, 2015

(51) Int. Cl.
*H04B 10/00* (2013.01)
*H04L 7/00* (2006.01)
(Continued)

(52) U.S. Cl.
CPC ............ *H04L 7/0075* (2013.01); *H04B 10/40* (2013.01); *H04B 10/6164* (2013.01); *H04L 7/0008* (2013.01); *H04L 7/0331* (2013.01); *H04L 7/04* (2013.01)

(58) Field of Classification Search
CPC ..... H04L 7/0075; H04L 7/04; H04L 7/0331; H04L 7/0008; H04B 10/6164; H04B 10/40
See application file for complete search history.

(56) References Cited

U.S. PATENT DOCUMENTS

| | | | | |
|---|---|---|---|---|
| 5,537,498 A | * | 7/1996 | Bausman | G02B 6/43 250/227.28 |
| 6,775,328 B1 | * | 8/2004 | Segaram | H04L 7/0337 375/219 |

(Continued)

FOREIGN PATENT DOCUMENTS

| CN | 101741935 | 6/2010 |
|---|---|---|
| JP | 2001034949 | 2/2001 |

OTHER PUBLICATIONS

Athavale, Abhijit., "High-Speed Serial I/O Made Simple: A Designers' Guide, with FPGA Applications," Retrieved from http://www.xilinx.com/publications/archives/books/serialio.pdf, Apr. 2012, 210 pages.

(Continued)

*Primary Examiner* — Danny Leung
(74) *Attorney, Agent, or Firm* — Brooks, Cameron & Huebsch, PLLC

(57) ABSTRACT

Apparatuses and methods for an optical data interface with electrical forwarded clock are provided. One example optical data interface (220, 320) can include a transmitter (224, 324) having a data input (232, 332) and a clock input (242, 342), and a receiver (226, 326) having a data output (271, 339) and a forwarded clock signal path (254, 376). An optical communication path (248, 348) is coupled between the data input (232, 332) and the data output (271, 339) and configured to communicate a data signal. An electrical communication path (236, 336) is coupled between the clock input (242, 342) and the forwarded clock signal path (254, 376). The electrical communication path (236, 336) is arranged to forward a clock signal used by the receiver (226, 326) as a reference for the optical data signal.

9 Claims, 4 Drawing Sheets

(51) Int. Cl.
  *H04B 10/40*   (2013.01)
  *H04B 10/61*   (2013.01)
  *H04L 7/033*   (2006.01)
  *H04L 7/04*    (2006.01)

(56) References Cited

U.S. PATENT DOCUMENTS

| | | | | |
|---|---|---|---|---|
| 7,386,042 B1* | 6/2008 | Brewer | .................... | H04L 1/205 |
| | | | | 375/226 |
| 7,433,440 B2* | 10/2008 | Noguchi | ................. | H04L 1/205 |
| | | | | 375/362 |
| 7,668,233 B2* | 2/2010 | Bergmann | ............. | G01R 29/26 |
| | | | | 375/224 |
| 7,792,157 B2* | 9/2010 | Cui | ....................... | H04J 3/0664 |
| | | | | 370/503 |
| 8,346,094 B2 | 1/2013 | Hamana et al. | | |
| 2002/0027689 A1* | 3/2002 | Bartur | ................... | H04B 10/40 |
| | | | | 398/139 |
| 2002/0054409 A1* | 5/2002 | Bartur | ................... | H04B 10/40 |
| | | | | 398/139 |
| 2002/0176131 A1* | 11/2002 | Walters | .................... | G06F 8/65 |
| | | | | 398/58 |
| 2003/0043434 A1* | 3/2003 | Brachmann | ............ | H04L 25/14 |
| | | | | 398/154 |
| 2005/0105913 A1* | 5/2005 | Ozeki | ................. | H04B 10/077 |
| | | | | 398/140 |
| 2005/0111845 A1* | 5/2005 | Nelson | ................ | H04B 10/672 |
| | | | | 398/138 |
| 2007/0050658 A1* | 3/2007 | Kuwata | ................ | H04L 7/0008 |
| | | | | 713/503 |
| 2009/0182912 A1* | 7/2009 | Yoo | ........................ | H03K 5/135 |
| | | | | 710/71 |
| 2010/0119236 A1* | 5/2010 | Uno | .................... | H04B 10/808 |
| | | | | 398/141 |
| 2010/0129073 A1* | 5/2010 | Hamana | .............. | H04B 10/801 |
| | | | | 398/25 |
| 2010/0316388 A1* | 12/2010 | Shastri | .................. | G09G 5/006 |
| | | | | 398/115 |
| 2011/0001531 A1* | 1/2011 | Nishi | ................... | H03L 7/0807 |
| | | | | 327/162 |
| 2015/0010312 A1* | 1/2015 | Berkram | .............. | H04L 7/0008 |
| | | | | 398/136 |

OTHER PUBLICATIONS

International Searching Authority, The International Search Report and the Written Opinion, Dec. 12, 2012, 9 Pages.

Palermo, Sam., "ECEN689: Special Topics in High-Speed Links Circuits and Systems," Retrieved from http://www.ece.tamu.edu/~spalermo/ecen689/lecture19_ee689_fwd_clk_deskew.pdf, Apr. 2012, 50 pages.

* cited by examiner

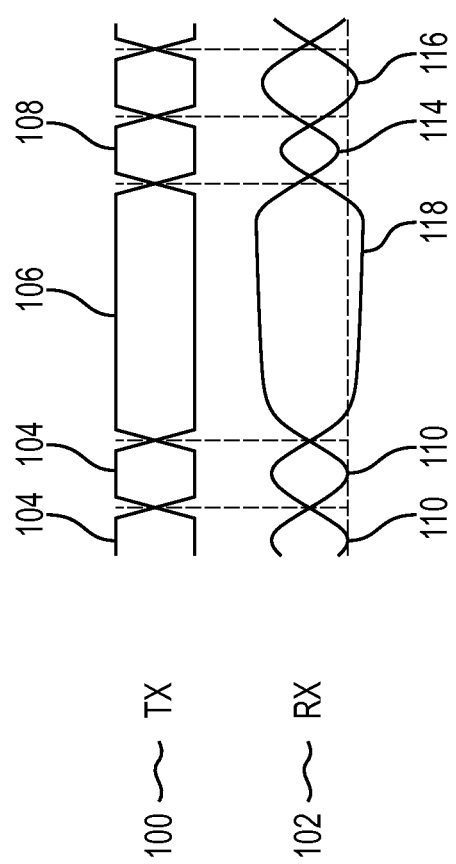

OPTICAL DATA INTERFACE WITH ELECTRICAL FORWARDED CLOCK

BACKGROUND

Cloud computing is increasing the use of remote data storage and/or application serving. However, the use of cloud computing resources and growing use of the Internet is increasing the quantity of information being communicated. In order to accommodate the increased demand for information communication, additional communication paths can be provided. However, this can be impractical and/or cost prohibitive. Another approach is to increase the quantity of information transmitted over a communication path in some applications. One way to increase the quantity of information transmitted over a communication path is to increase the rate at which data is transmitted. This can be done by increasing the frequency of data transmission. However, increasing the frequency of data signals can be expensive in terms of infrastructure cost to accommodate greater bandwidth.

Optical link interfaces can be more expensive than electrical link interfaces. Therefore, optical link interfaces are typically designed to accommodate very high bit-rates to amortize the cost of the optical components, e.g., photoemitters, photodetectors, optical fibers, etc., across as many "bits" as possible. However, as data rate increases, jitter becomes a larger concern. Jitter is the variation of the ideal signal transition placement. As the time duration of transferring each bit decreases, errors in signal transitions between bits become an increasing larger fraction of the entire time duration associated with a bit. That is, jitter can be an increasingly large concern in high speed communications.

BRIEF DESCRIPTION OF THE DRAWINGS

FIG. 1 is a timing diagram showing inter-symbol interference (ISI).

DETAILED DESCRIPTION

Figure 2A:
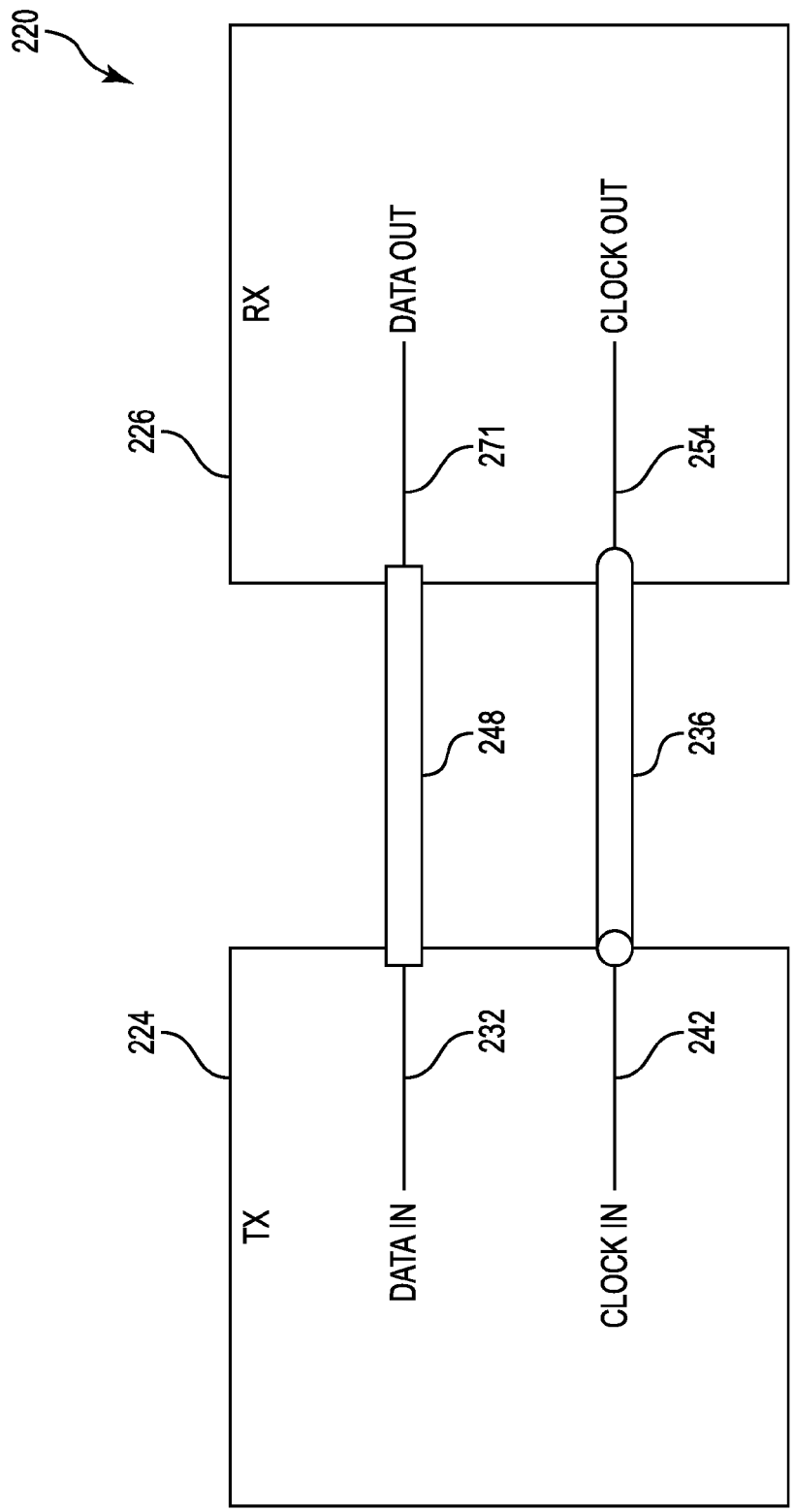
FIG. 2A is a block diagram illustrating an optical data interface with an electrical forwarded clock in accordance with one or more embodiments of the present disclosure.

Apparatuses and methods for an optical data interface with electrical forwarded clock are provided. One example optical data interface can include a transmitter having a data input and a clock input, and a receiver having a data output and a forwarded clock signal path. An optical communication path is coupled between the data input and the data output and configured to communicate a data signal. An electrical communication path is coupled between the clock input and the forwarded clock signal path. The electrical communication path is arranged to forward a clock signal used by the receiver as a reference for the optical data signal.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

The terms "first," "second," "third," and "fourth" may be used herein, and/or in the claims, merely for convenience in differentiating the nomenclature of various features from one another. The use of such terms does not necessarily imply that the materials are of different composition, but sometimes are used to distinguish between materials formed at different elevations, at different times, or in different manners, even if of the same composition. The use of such terms does not intend to convey a particular ordering of the features, including, but not limited to, an order of forming.

FIG. 1 is a timing diagram showing inter-symbol interference (ISI). ISI is where one symbol interferes with one or more other symbols, and can be a challenge to high-speed data links.

FIG. 1 shows digital transmitted signals 100 and corresponding digital received signals 102. The digital transmitted signals 100 and digital received signals 102 can each be comprised of two signals, e.g., a differential signal, which can be of opposite polarity of one another, as shown. The two signals can provide symbol delineations, e.g., zero crossings, therebetween as the signals transition between two states when the data changes from one binary symbol, e.g., bit, to the opposite binary symbol, e.g, from a "0" to a "1."

The length of time, i.e., period, of one symbol is shown in FIG. 1 by the vertical dashed lines corresponding to the crossing point of the two transmitted signals 100 between adjacent symbols. It will be observed that the digital transmitted signals 100 initially show a number of successive symbols alternating between opposite values 104, followed by a number of successive symbols of the same value 106, followed again by a symbol of the opposite value 108. More specifically, for the successive symbols alternating between opposite values 104 and 108, there is a transition of the two signals comprising the digital transmitted signals 100 between individual symbols. However, for the number of successive symbols of the same value 106 there are no transitions between the adjacent individual symbols when the symbols are all of a same value 106.

The digital received signals 102 show that the received number of successive symbols alternating between opposite values 110 corresponding to the transmitted number of successive symbols alternating between opposite values 104 switch data state at the length of time of one symbol. That is, the crossing point of the two received signals 102 between adjacent symbols occurs at one symbol period intervals, just as is the case for the transmitted signals. Because of the switching between the different data states that occurs in adjacent symbols, the amplitude of the received signals 102 is consistent between received symbols. That is, for an electrical communication path, the communication path capacitance has the same time to charge before having to switch to the opposite data state.

However, for the portion of the transmitted signals 100 having the number of successive symbols of the same value 106, the received number of successive symbols of the same value 118 does not switch state between adjacent symbols. Thus the magnitude of the received number of successive symbols of the same value 118 can increase as the communication path capacitance is charged for a longer time at a same data state. That is, an electrical communication path capacitance has more time to charge where a number of successive symbols are of the same data state before having to discharge and switch to the opposite data state. Therefore, the magnitude of the data state for the received number of successive symbols of the same value 118 can reach a greater signal magnitude.

However, when a different symbol value is subsequently transmitted, e.g., a symbol of the opposite value 108, the electrical communication path capacitance has to be discharged so that it can be charged to the polarity/value of the different, e.g., opposite, data state. As can be seen in FIG. 1, the transition of electrical communication path from the greater magnitude charge of the received number of successive symbols of the same value 118 takes more time, which delays the received signals 102 crossing point between the received number of successive symbols of the same value 118 and the received symbol of the opposite value 114. The crossing point of the received signals 102 is delayed beyond the crossing point of the corresponding transmitted signals 100, as indicated by the vertical dashed line. For received symbol 114, the electrical communication path has less time to charge to the new state, and so results in lower amplitude received signals 102 for the received symbol of the opposite value 114. These changes in received symbol duration and/or amplitude can result in symbol detection errors.

Where there are a number of successive symbols alternating between opposite values following the number of successive symbols of the same value 106, it can be seen that one or more received symbols 116 following the first received symbol of the opposite value 114 can also have crossing point(s) that are not aligned with the crossing points of the transmitted symbols. For example, received symbol 116 can have a period that exceeds the corresponding transmitted symbol period. Additional received symbols can continue to have crossing point(s) that are not aligned with the crossing points of the transmitted symbols as the electrical communication path charging and discharging returns to the equilibrium shown for the received number of successive symbols alternating between opposite values 110.

The changes to received symbol durations shown in FIG. 1 are referred to as inter-symbol interference (ISI). ISI occur when a data stream includes a number of symbols having the same value followed by one or more symbols of the opposite and/or alternating values, and is more pronounced as the quantity of symbols having the same value increases and the symbols that follow alternate state rapidly. The variation of the ideal transition placement due to ISI is referred to as jitter. The extent of the ISI and/or jitter can be impacted by the quantity of symbols having the same value and/or data pattern after the number of symbols having the same value.

Signal jitter can be introduced by characteristics of a communication path as well. The edge(s) of the symbols can move around, and the moving around of symbol edges can have a frequency to the movement. However, a receiver can tolerate synchronizing jittery data to a jittery forwarded clock, such as if the jitter is common mode—similarly occurring in data and clock signals.

To address jitter, receivers can perform jitter checking. Jitter checking achieves best results when a same clock source is used and there is no signal skew, thus the advantage of forwarding a clock signal can be appreciated for jitter checking applications. Adding a relative delay to one signal, e.g., data signal delayed relative to a clock signal, reduces deskew, and causes trackability to drop. Slow jitter can be tracked well. However, high frequency jitter can involve rapid signal changes, and is much more difficult to track well. Encoding data for communication can increase the quantity of information to be communicated, which can necessitate even higher frequency data transfer rates. Higher frequency data transfer rates, and the corresponding smaller symbol periods, are more susceptible to the effects of jitter.

Local clocking of a data signal can be accomplished in several ways: using a common reference clock at each end, using a recovered clock, and communicating a separate clock. One previous approach is to communicate data only and not communicate a clock signal, and use a common clock reference. Clocking is only done locally, e.g., at the chip. Not having to communicate a clock signal saves communication path bandwidth. Another previous approach involves sending the data and clock, and recovering the clock at the receiver. For example, the transmitted signal may be 10 gigabytes, from which a 5 or 2.5 GHz clock signal may be recovered at the receiving end. Forwarding a separate clock requires additional infrastructure, including a clock signal communication path and forwarded clock architecture at each end.

FIG. 2A is a block diagram illustrating an optical data interface with an electrical forwarded clock in accordance with one or more embodiments of the present disclosure. The optical data interface 220 shown in FIG. 2A includes a transmitter 224 and a receiver 226. The transmitter 224 and receiver 226 are connected by at least one optical communication path 236 and an electrical communication path 248. An optical communication path 236 can transmit data over longer distances with less attenuation as compared to an electrical communication path. The at least one optical communication path 236 is configured for communicating a data signal and the electrical communication path 248 is configured for forwarding a clock signal. Communicating the clock signal over an electrical communication path is less expensive than also communicating the clock signal over an optical communication path, e.g., one less optical communication path is used.

The transmitter 224 includes a data input 232 and a clock input 242. The receiver 226 includes a data output 271 and a forwarded clock signal path 254. As shown in FIG. 2A, the optical communication path 248 is coupled between the data input 232 and the data output 271. The electrical communication path 236 is coupled between the clock input 242 and the forwarded clock signal path 254. The electrical communication path is arranged to forward a clock signal used by the receiver as a reference for the optical data signal. That is, the forwarded clock signal can be used as a timing reference for determining the data symbols.

The attenuation of electrical communication path is frequency dependent. That is, electrical communication paths have frequency-dependent loss. As frequency increases, so does electrical attenuation. Optical communication paths of an optical link interface can have reduced signal strength loses as compared to that electrical communication paths, particularly over long distances and/or higher frequency operation, since optical communication paths are not subject to the same increases in communication path degradation, e.g. attenuation increases, as bit rate and data signal frequency increases.

An optical communication path uses light to communicate information rather than electrical signals. An optical interface can include an optical communication path coupled between an optical transmitter, e.g., light source, and an optical receiver. The optical transmitter can convert an electrical signal into a light signal, such by use of a vertical cavity surface emitting laser (VCSEL), a light emitting diode (LED) an injection laser diode (ILD), or other electrical-to-light converting element. The optical receiver can be, for example, a photodiode, photo detector, etc. The optical communication path can be a single-mode or multi-mode fiber optic cable, for instance.

The previous discussion of ISI with respect to FIG. 1 was based on an electrical communication path. Frequency-dependent loss of the electrical communication path can cause ISI under certain circumstances and lead to signal jitter. An optical communication path does not have much frequency-dependent loss, or very little loss in short distance, with changing signals representing changing symbols. Therefore, an optical communication path does not suffer the effects of ISI. As such, an optical communication path is suited for communication of a random data pattern, which can involve a number of successive symbols of the same value followed by a number of symbols of the opposite value and/or alternating values. However, optical interfaces can be expensive.

As also discussed above with respect to FIG. 1, a pattern of alternating adjacent symbols, e.g., as shown by transmitted symbols 104 and received symbols 110 in FIG. 1, are not subject to ISI since transmitted state transitions are regular and periodic. One such pattern of alternating adjacent symbols is a clock signal. As opposed to a random data pattern, a clock pattern has a unique characteristic in the electrical domain because it does not become distorted by ISI. As such, a clock signal can be communicated over an electrical communication path without experiencing detrimental ISI.

According to one or more embodiments of the present disclosure, a communication link interface that uses the optical components for communicating data symbols provides the benefit of reduced signal distortion, e.g., due to ISI, where it is most required, e.g., for random data patterns. Furthermore, the communication link interface of the present disclosure utilizes an electrical communication path over which to communicate a clock signal. The electrical communication path can be a lower cost alternative to using an additional optical link for transmitting a clock signal.

Although an optical communication path does not suffer from ISI due to communication path capacitive charging/discharging, other channel attributes can cause signal attenuation and skew, which can also lead to jitter. Therefore, a transmitted clock signal can be used at the receiver for deskew operations to provide high frequency jitter tracking, and thus improved communication link performance.

An optical data interface with electrical forwarded clock according to the present disclosure allows and facilitates high frequency jitter tracking while reducing the number of expensive optical components. A forwarded clock, in which an explicit clock is sent along with one of more data bits of a link, allows tracking of jitter where this jitter exists on both the data bits and the clock used to generate the final receiving clock. The higher the frequency of the forwarded clock, the more precise the jitter "tracking" can be enabled since higher frequency jitter can be tracked with a higher frequency clock.

According to various embodiments of the present disclosure, an electrical clock lane is used as part of a communication link interface. The communication link interface can have one or more optical communication paths for communication optical data symbols, e.g., bits.

The clock lane can be driven from the same clock generation logic on the transmit side of the communication link interface as the rest of the data bits. The clock can be sent, along with the data, to a receiver where the forwarded clock signal can be used as a reference for a receiver clock data recovery loop. In the degenerate case, the clock can directly latch the data and the communication link interface can be operated "source synchronous," i.e., synchronous with the clock at the transmitter.

The communication link interface of the present disclosure can avoid using bandwidth, e.g., of an optical data channel, to forward a clock signal, or the cost of providing an additional, e.g., dedicated, optical communication path as a clock lane to forward the clock. The communication link interface of the present disclosure also avoids use of clock data recovery techniques, e.g., from the data signal(s) on the receive ends of the optical link, which avoids the additional clock lane, but cannot provide the jitter tracking capability (typically 10 s of MHz rather than GHz).

According to various embodiments of the present disclosure, the transmitter 224 and receiver 226 can be discrete components separated by large distances, e.g., feet, miles, or a computer chip-to-chip interconnect, among others. According to some embodiments, the transmitter 224 can be a transmitting chip, and the receiver 226 can be a receiving chip, for example, within a computing system, e.g., on a same circuit board, etc.

According to various embodiments, the transmitter 224 and receiver 226 can be part of a board backplane package capable of communicating at data transfer rates of 800 megabit per second to 25 gigabit per second, e.g., 10 gigabit/second, 16 gigabit/second, etc. That is, the optical interface can be implemented through a backplane or cable.

Figure 2B:
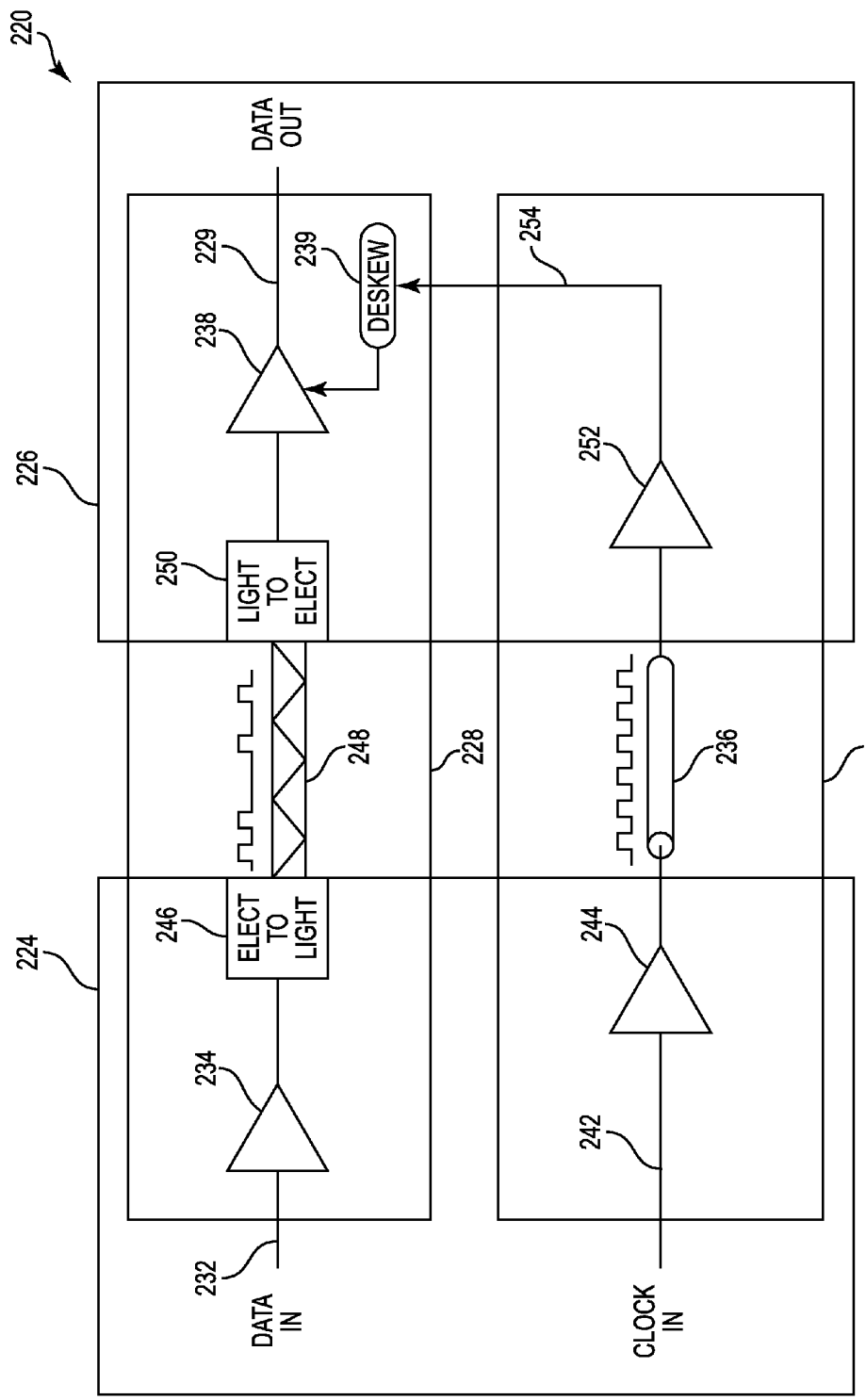
FIG. 2B is a block diagram illustrating an optical data interface with an electrical forwarded clock in accordance with one or more embodiments of the present disclosure.

FIG. 2B is a block diagram illustrating an optical data interface with an electrical forwarded clock in accordance with one or more embodiments of the present disclosure. FIG. 2B provides additional details of the optical data interface 220 shown in FIG. 2A. FIG. 2B shows a transmitter 224 and a receiver 226. FIG. 2B further shows an optical data interface 228 and an electrical clock interface 230.

The optical data interface 228 includes at least one optical communication path 248 coupled between the transmitter 224 and the receiver 226. An optical transmitter 246 is connected to each optical communication path 248 within the transmitter 224, and an optical receiver 250 is connected to each optical communication path 248 within the receiver 226. At the transmitter 224, a data input 232 is connected to a transmitter data driver 234, which is connected to the optical transmitter 246. At the receiver 226, the optical receiver 250 is connected to a receiver data driver 238, which is connected to a data output 229.

The electrical clock interface 230 includes an electrical communication path 236 coupled between the transmitter 224 and the receiver 226. At the transmitter 224, a clock input 232 is connected to a transmitter clock driver 244, which is connected to the electrical communication path 236. At the receiver 226, the electrical communication path 236 is connected to a receiver clock driver 252, which is connected to a forwarded clock signal path 254. The forwarded clock signal path 254 can be connected to a deskew circuit 239, which can be connected into the receiver data driver 238 for use in deskew operations, thus providing high frequency jitter tracking. In this manner, the forwarded clock signal can be used as a reference for a receiver clock data recovery loop, e.g., used as a timing reference in determining the data symbol values.

Figure 3:
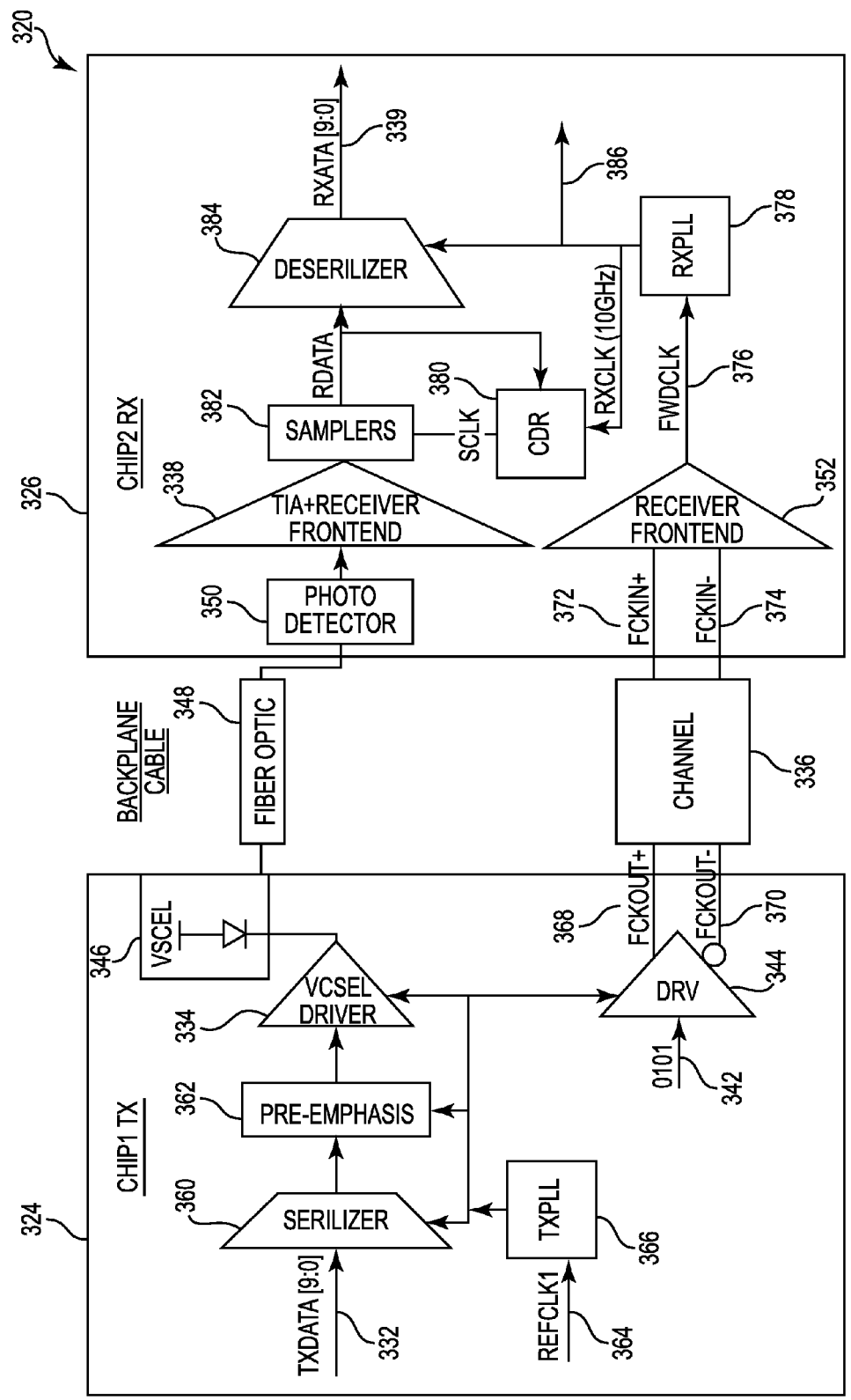
FIG. 3 is a block diagram illustrating an optical data interface with an electrical forwarded clock in accordance with one or more embodiments of the present disclosure.

FIG. 3 is a block diagram illustrating an optical data interface with an electrical forwarded clock in accordance with one or more embodiments of the present disclosure. FIG. 3 provides additional details for an example embodiment of a communication link interface, such as that shown in FIGS. 2A and/or 2B. FIG. 3 shows a optical data interface 320 including a transmitter 324 and a receiver 326. The transmitter 324 comprises a transmitting chip, and the receiver 326 comprises a receiving chip. The transmitter 324 and the receiver 326 are connected by a backplane cable that includes at least one optical communication path 348, e.g., fiber optic channel, and an electrical communication path 336, e.g., conductive channel such as a wire, trace, etc. The optical communication path 348 may be configured to communicate at data rates up 10 gigabits per second, or more, for example. The electrical communication path 336 may be configured to communicate a clock signal at 5 GHz/2.5 GHz. However, embodiments of the present disclosure are not limited to any particular frequencies, and communication paths may be implemented with configurations supporting higher or lower signal frequencies.

The transmitter 324 includes a clock input 342 coupled to a transmitter clock driver 344. Outputs from the transmitter clock driver 344 includes positive 368 and inverted 370 forwarded clock output signal paths, which are connected to the electrical communication path 336. The electrical communication path 336 is connected to a receiver clock driver 352, which can also be referred to as a receiver frontend. The receiver frontend can, for example, implement high pass filtering. The receiver clock driver 352 has forwarded clock input 372 and an inverted forwarded clock input 374 coupled to the receiver end of the electrical communication path 336. The output of the receiver clock driver 352 is a forwarded clock signal path 376, which is connected to a receiver phase lock loop (PLL) 378. The receiver phase lock loop (PLL) 378 can be utilized in the receiver 326 (prior to clock data recovery), to produce a forwarded clock that can also be at less than the frequency from the data frequency, e.g., half, quarter, eighth, etc. Such a reduced-frequency forwarded clock signal can facilitate additional high frequency jitter tracking.

Transmitter 324 also includes a data input 332 upon which data to be transmitted is received into a serializer 360. The serializer 360 converts parallel input data into a serial stream of data. The output of the serializer 360 is connected to a pre-emphasis circuit 362, the output of which is used to control an optical transmitter driver 334, e.g., a VCSEL driver. The optical transmitter driver 334 is connected to an optical transmitter 346, which may include a VCSEL or other type of light source, for example. The optical transmitter 346 is optically coupled to the optical communication path 348, as represented in FIG. 3.

Transmitter 324 also includes transmitter phase lock loop 366 having a reference clock signal path 364 as an input thereto. An output of the transmitter PLL can be connected into each of the serializer 360, the pre-emphasis circuit 362, the optical transmitter driver 334, and the transmitter clock driver 344 to form and synchronize symbols that are transmitted.

At the receiver 326, the optical communication path 348 is optically coupled to an optical receiver 350, which can comprise a photo detector. The output of the optical receiver 350 is connected to a receiver data driver 338, which can operate as a transimpedance amplifier (TIA) and perform other receiver front end functionality. The output from the receiver data driver 338 is connected to a sampling circuit 382, which produces the received data. The received data is connected to a de-serializer 384, which converts the serial data stream into a parallel format on a received data output bus 339.

As is shown in FIG. 3, a receive clock, e.g., 10 GHz, can be formed by the receiver PLL 378. The output of the receiver PLL 378 is connected to the de-serializer 384, the clock and data recovery circuit (CDR) 380, and may be provided at a received clock output 386 from the receiver 326. The CDR 380 is connected to the sampling circuit 382, providing a sample clock.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method, comprising:
    transmitting, via transmitter chip of a transmitting device, a data signal over an optical communication path, the transmitting chip to serialize data of the data signal;
    providing differential clock signals from a reference clock signal of a phase lock loop; and
    forwarding, via the transmitting chip of the transmitting device, a clock signal corresponding to the differential clock signals over an electrical communication path, the clock signal to be used by a receiver chip of a receiving device as a reference to determine the data signal received via the optical communication path, the receiver chip to sample the data signal, deserialize the data of the data signal, and implement a phase lock loop to form a receiver clock signal from the clock signal.

2. The method of claim 1, wherein the forwarded clock as a reference enables the receiving device to track high frequency jitter in the data signal.

3. The method of claim 1, wherein transmitting the data signal includes:
    serializing input data using a signal from a transmitter phase lock loop; and de-serializing the received data signal using a clock signal from the receiver phase lock loop.

4. The method of claim 2, wherein the forwarded clock signal is used by the receiving device to form a receiver clock, the receiver clock having a frequency of less than the frequency from the data frequency.

5. An apparatus comprising:
a transmitter chip comprising:
  a data input;
  a serializer connected to the data input, the serializer configured to convert data from parallel to serial;
  an optical transmitter optically coupled to an optical communication path (348);
  a transmitter data driver coupled between the serializer and the optical transmitter; and
  a transmitter clock driver coupled between a clock input and an electrical communication path, the transmitter clock driver configured to provide differential clock signals to the electrical communication path; and
  a transmitter phase lock loop having a reference clock input and an output connected to provide a reference clock signal as an input into each of the serializer the transmitter data driver, and the transmitter clock driver,
a receiver chip; and
a backplane cable coupled between the transmitter chip and the receiver chip, the backplane cable including the optical communication path configured to transmit the data and the electrical communication path configured to forward a clock signal used by the receiver chip as a reference in determining received data.

6. An apparatus comprising:
a transmitter chip;
a receiver chip comprising:
  an optical receiver optically coupled to an optical communication path;
  a sampling circuit connected to the optical receiver to sample received data;
  a de-serializer connected between the sampling circuit and the data output, the de-serializer configured to convert data from serial to parallel; and
  a receiver phase lock loop having a forwarded clock as an input and an output connected to provide a reference clock signal as an input into each of the sampling circuit and the de-serializer; and
a backplane cable coupled between the transmitter chip and the receiver chip, the backplane cable including the optical communication path configured to transmit the data and the electrical communication path configured to forward a clock signal used by the receiver chip as a reference in determining received data.

7. The apparatus of claim 5, further comprising:
a backplane cable comprising the optical communication path and the electrical communication path, the backplane cable coupled between a receiver chip and a transmitter chip comprising the data input, the serializer, the optical transmitter, the transmitter data driver, the transmitter clock driver, and the transmitter phase lock loop.

8. The apparatus of claim 6, further comprising:
a backplane cable comprising the optical communication path and the electrical communication path, the backplane cable coupled between a transmitter chip and a receiver chip comprising the optical receiver, the sampling circuit, the de-serializer, and the receiver phase lock loop.

9. The apparatus of claim 6, further comprising:
further comprising a deskew circuit connected to the forwarded clock signal path, the deskew circuit configured to provide high frequency jitter tracking in forming a data signal on the received data.

* * * * *